United States Patent Office
3,642,862
Patented Feb. 15, 1972

3,642,862
β-(DIMETHYLAMINO)ETHYLESTERS OF
3-O-(CARBAMOYL) CASSENIC ACIDS
Dietrich Stauffacher, Reinach, Basel-Land, and Hartmut Hauth, Riehen, Switzerland, assignors to Sandoz Ltd. (also known as Sandoz AG), Basel, Switzerland
No Drawing. Filed Aug. 22, 1968, Ser. No. 754,737
Claims priority, application Switzerland, Aug. 31, 1967, 12,217/67
Int. Cl. C07c 125/06
U.S. Cl. 260—468.5                          13 Claims

ABSTRACT OF THE DISCLOSURE

β-(Dimethylamino)ethyl esters of 3-O-(carbamoyl)-cassenic acids. These compounds are useful as cardiotonic agents with a positive inotropic effect.

The present invention relates to new alicyclic compounds and processes for their production.

The present invention provides compounds of general Formula I,

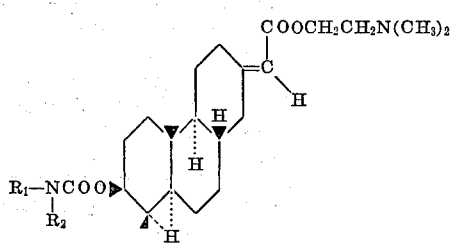

(I)

in which either:

$R_1$ signifies hydrogen, and
$R_2$ signifies hydrogen, a lower alkyl (1 to 4 carbon atoms), a lower alkenyl (1 to 4 carbon atoms), an aryl, an Ω-di(lower, i.e. 1 to 4 carbon atoms)alkylamino-(lower, i.e. 1 to 4 carbon atoms) alkyl or a furfuryl radical, or an aralkyl radical which may optionally be substituted in the ring by a lower (1 to 4 carbon atoms) alkoxy radical or in the chain by a hydroxy substituted lower alkyl (1 to 4 carbon atoms) radical, or each of $R_1$ and $R_2$, which may be the same or different, signify a lower alkenyl (1 to 4 carbon atoms) radical, or
$R_1$ and $R_2$ together with the nitrogen atom signify a morpholine radical, and their acid addition salts with inorganic and organic acids.

The present invention further provides the following processes for the production of compounds of general Formula I:

(a) Compounds of general Formula II,

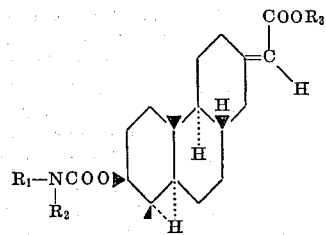

(II)

in which:

$R_1$ and $R_2$ have the above significance, and
$R_3$ is a hydrocarbon group, capable of interchange with 2-(dimethylamino)ethanol, for example an alkyl group containing from 1 to 4 carbon atoms, or a benzyl or a cyclohexyl group, are subjected to an interchange of ester radicals with 2-(dimethylamino)ethanol.

(b) Compounds of general Formula III,

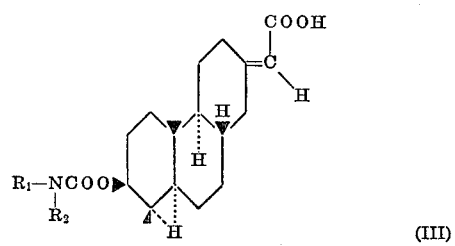

(III)

in which $R_1$ and $R_2$ have the above significance, are converted into an active acid derivative and this is converted to the desired ester by reaction with 2-(dimethylamino)ethanol or 2-(dimethylamino)ethyl chloride or bromide.

(c) Rac. 7-desoxo-14-desmethyl-cassaine is reacted with (i) an isocyanate of Formula VII, $$R_2\text{—}N\text{=}C\text{=}O \qquad (VII)$$

in which $R_2$ has the above significance, or with (ii) phosgene and an amine of Formula VI,

(VI)

in which $R_1$ and $R_2$ have the above significance.

The compounds obtained in accordance with the above processes are then optionally converted into their acid addition salts with inorganic or organic acids.

Process (a) may, for example, be effected as follows:
A compound of general Formula II is dissolved in 2-(dimethylamino)ethanol, pulverized potassium hydroxide is added and the mixture is stirred at room temperature for about 24 hours. The so formed product of interchange of ester radicals may be isolated and purified in the usual manner.

Process (b) may, for example, be effected as follows:
A compound of general Formula III is converted into the corresponding acid chloride or acid bromide, e.g. with thionyl chloride in the presence of triethylamine or another suitable tertiary amine. This acid chloride or bromide reacts with 2-(dimethylamino)ethanol in the presence of an acid-binding agent, which may be an excess of 2-(dimethylamino)ethanol, with the formation of compounds of general Formula I. It is also possible, however, to convert the compounds of general Formula III in the usual manner into an alkali metal salt, preferably the sodium salt, and subsequently react this with 2-(dimethylamino)ethyl chloride, in an inert solvent, e.g. benzene, in the absence of moisture and optionally at an elevated temperature.

Process (c) may, for example be effected as follows:
Rac. 7-desoxo-14-desmethyl-cassaine is reacted with the isocyanate of Formula VII, e.g. phenylisocyanate, in the presence of a tertiary base, e.g. triethylamine or pyridine, at a temperature between 60° and 100° C., or phosgene is added to rac. 7-desoxo-14-desmethyl-cassaine in a solvent which is inert under the reaction conditions, at room temperature and the resulting product is subsequently reacted with an amine of Formula VI, e.g. aniline, in a solvent which is inert under the reaction conditions, in the presence of a tertiary base, e.g. triethylamine or pyridine. The resulting compound may be isolated and purified in manner known per se, e.g. by crystallization or chromatography.

The new compounds of general Formula I may be converted into acid addition salts which are crystalline at room temperature by reacting with acids. Examples of acids which may be used for acid addition salt formation are organic acids, e.g. fumaric acid, maleic acid, tartaric acid, methane-sulphonic acid, or inorganic acids, e.g. hydrochloric acid, hydrobromic acid and sulphuric acid.

The compounds of general Formulae II and III, used as starting materials for the production of compounds of general Formula I, are produced in accordance with the following process which also forms part of the present invention:

Rac. 3β-hydroxy-14-desmethyl-cassenic acid ester of Formula IV,

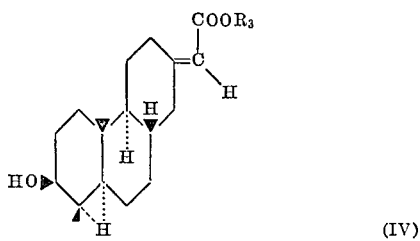

(IV)

in which $R_3$ has the above significance and is preferably an ethyl or a tert-butyl group, is reacted with phosgene to give rac. 3β-chloroformyloxy-14-desmethyl-cassenic acid ester of Formula V,

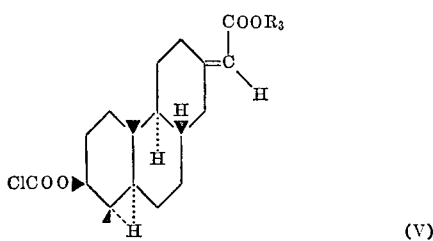

(V)

in which $R_3$ has the above significance and is preferably an ethyl or a tert-butyl group, and this is subsequently treated with an amine of general Formula VI. It is not necessary to isolate the rac. 3β-chloroformyloxy-14-desmethyl-cassenic acid ester, so that the reaction of rac. 3β-hydroxy-14-desmethyl-cassenic acid ester with phosgene and subsequently with an amine of general Formula VI to give compounds of general Formula II may be effected in the same vessel. The above reactions are effected in an inert solvent, e.g. benzene or tetrahydrofuran, and in the presence of a tertiary base, e.g. triethylamine or pyridine.

The compounds of general Formula II are subsequently hydrolysed under mild conditions, e.g. by treating with trifluoroacetic acid at room temperature, to give compounds of general Formula III. This procedure has the advantage that the compounds of general Formula III may be obtained in a particularly simple and careful manner.

The compounds of Formula I are useful because they possess pharmacological activity in animals. In particular, the compounds possess cardiac activity and may be used as cardiotonic agents with a positive inotropic effect as indicated by their positive inotropic effect in the isolated perfused heart test [H. Emmenegger et al., Helv. Physiol. Acta 20, 213–226 (1962)] in the cat.

For such use, the compounds may be combined in conventional manner with a pharmaceutically acceptable carrier, and such other adjuvants as may be desirable, for oral administration in the form of a tablet, dragée, syrup or the like or for intramuscular injection in the form of an injectable soluble or suspension. Furthermore, the compounds may similarly be administered in the form of their pharmaceutically acceptable acid addition salts, which possess the same order of activity as the free base.

Examples of suitable carriers are:

For tablets and dragées:
  lactose, starch, talc and stearic acid;
For syrups:
  solutions of cane sugar, invert sugar and glucose;
For injectable solutions:
  water, alcohols, glycerin and vegetable oils.

The preparations may furthermore contain suitable preserving, stabilizing and wetting agents, solubilizers, sweetening and colouring substances and flavourings.

For the above-mentioned use, the dosage administered will, of course, vary depending on the compounds employed, the mode of administration and the treatment desired. However, in general, satisfactory results are obtained when the compounds are administered by intramuscular injection at a daily dosage of from about 0.005 to about 0.1 milligram per kilogram of animal body weight, preferably given in divided doses 2 to 3 times a day. For most mammals the total daily dosage is generally in the range of from about 0.35 to about 7 milligrams and unit dosage forms suitable for administration orally or by intramuscular injection comprise about 0.12 to about 3.5 mg. of the compound admixed with a solid or liquid pharmaceutical carrier or diluent.

Unless other indications are given, the UV spectra were taken in ethanol, using methylene chloride as solvent. $CDCl_3$ was used as solvent in the NMR spectra. The position of the signals is indicated in $\delta$ (p.p.m.), tetramethylsilane ($\delta_{TMS}=0$) being used as reference substance. The indicated numbers of hydrogen atoms were ascertained by electronic integration.

The chromatograms were effected in accordance with the elution method on silica gel, the thin layer chromatograms on silica gel G layer. Methylene chloride+1 to 20% of methanol was used as eluant. The spots were made visible by vaporizing with iodine and/or by spraying with $KMnO_4$ solution.

In the following non-limitative examples all temperatures are indicated in degrees centigrade. The melting points are uncorrected.

EXAMPLE 1.—RAC. 3 - O - (N - BUTYL - CARBAMOYL)-7-DESOXO-14-DESMETHYL-CASSAINE (a) Rac. 3β-(n-butyl-carbamoyloxy)-14-desmethyl-cassenic acid ethyl ester A solution of 4 g. (12 millimols) of racemic 3β-hydroxy-14-desmethyl-cassenic acid ethyl ester and 1.21 cc. (15 millimols) of pyridine in 200 cc. of absolute benzene is added dropwise to 18 cc. of a molar solution of phosgene in benzene at +5° and in the absence of moisture and the mixture is stirred at +5° for 30 minutes. After stirring for a further hour at room temperature nitrogen is flushed through the reaction mixture and a solution of 1.79 cc. (18 millimols) of butylamine and 1.21 cc. (15 millimols) of pyridine in 30 cc. of absolute benzene is added dropwise to the reaction mixture at room temperature. After stirring for 3 hours a further 0.6 cc. (6 millimols) of n-butylamine and 0.24 cc. (3 millimols) of pyridine in 5 cc. of benzene are added and after a further 2 hours the mixture is worked up. 200 cc. of methylene chloride and 25 cc. of ice water are added to the reaction mixture, the organic phase is separated and successively washed with 2 N hydrochloric acid, a saturated sodium bicarbonate solution and again water, is dried and concentrated by evaporation. The oily crude product is further purified by chromatography on a 50-fold quantity of silica gel, whereby elution with petroleum ether/ether (8:2) yields the desired product. Crystallization from ether/petroleum ether yields colourless crystals having a melting point of 134 to 137°. Recrystallization from ether/petroleum ether yields colourless prisms having a melting point of 136 to 137°.

UV spectrum: Maximum at 223 nm. (log ε=4.26)
IR spectrum: inter alia bands at 3450, 2850, 1710, and 1648 cm.$^{-1}$
NMR spectrum: inter alia signals at—
    0.81; 0.83; 0.90 p.p.m. singlets for C—CH$_3$ (9H)
    1.27 p.p.m. triplet }
    4.15 p.p.m. quadruplet } for —COOCH$_2$CH$_3$
    3.18 p.p.m. multiplet for —CH$_2$—NH—COO— (2H)
    3.6–4.1 p.p.m. multiplet for —C$_{12}$—H (1H)
    4.2–4.7 p.p.m. multiplet for

—CH$_2$—NH—COO—CH= (2H)

5.57 p.p.m. wide signal for C=C—H (1H)

(b) Rac. 3-O-(n-butyl-carbamoyl)-7-desoxo-14-desmethyl-cassaine 1.04 g. (2.4 millimols) of rac. 3β-(n-butyl-carbamoyloxy)-14-desmethyl-cassenic acid ethyl ester are dissolved in 20 cc. of 2-dimethylaminoethanol, 67.5 mg. (1.2 millimols) of pulverized potassium hydroxide are added and the mixture is stirred overnight at room temperature. After concentrating carefully the residue is taken up in ether. The ether phase is first washed with water and then thrice with ice-cold 2 N hydrochloric acid. The combined aqueous hydrochloric acid extracts are subsequently made alkaline while cooling with ice and are exhaustively extracted with methylene chloride. The extract is dried and concentrated whereby the free base, which is uniform in accordance with the thin layer chromatography is obtained.

IR spectrum: inter alia bands at 3450, 2860, 2760, 1710 and 1648 cm.$^{-1}$
NMR spectrum: inter alia signals at—
    0.82; 0.85; 0.90 p.p.m. singlets for C—CH$_3$ (9H)
    2.30 p.p.m. singlets for N(CH$_3$)$_2$ (6H)
    2.60; 4.22 p.p.m. triplets for

—COO—CH$_2$CH$_2$—N= (2/2H)

about 2.9–3.3 p.p.m. multiplet for

—CH$_2$—CH$_2$—NH— (2H)

3.65–4.1 p.p.m. multiplet for C$_{12}$—H (1H)
    4.2–4.8 p.p.m. multiplet for

CH$_2$—NH—COO—CH— (2H)

5.65 p.p.m. wide signal for C=C—H (1H).

Hydrochloride

The crude base is dissolved in a small amount of acetone, the calculated amount of hydrochloric acid in ether is added, the mixture is concentrated and crystallized by the addition of ether: colourless crystals having a melting point of 139 to 142°.

After recrystallizing once more from acetone/ether colourless needles, having a melting point of 143 to 146°, are obtained. UV spectrum: maximum at 226 nm. (log ε=4.22).

EXAMPLE 2.—RAC. 3-O-(ALLYL-CARBAMOYL)-7-DESOXO-14-DESMETHYL-CASSAINE (a) Rac. 3β-(allyl-carbamoyloxy)-14-desmethyl-cassenic acid ethyl ester.—(1) From rac. 3β - hydroxy - 14-desmethyl-cassenic acid ethyl ester A solution of 4 g. (12 millimols) of rac. 3β-hydroxy-14-desmethyl-cassenic acid ethyl ester and 1.21 cc. (15 millimols) of pyridine in 200 cc. of absolute benzene is added dropwise to 18 cc. of a molar solution of phosgene in benzene at +5° and in the absence of moisture and the reaction mixture is subsequently stirred at room temperature. After 2½ hours the mixture is flushed with nitrogen, cooled to +5°, a solution of 1.34 cc. (18 millimols) of allylamine and 1.45 cc. (18 millimols) of pyridine in 20 cc. of absolute benzene is added dropwise and the mixture is further stirred at room temperature. After 2 hours a further 0.56 cc. (7.5 millimols) of allylamine and 0.60 cc. (7.5 millimols) of pyridine in 20 cc. of absolute benzene are added and the mixture is stirred at room temperature for a further 3 hours. Working up is effected by adding 200 cc. of methylene chloride and 25 cc. of ice water, separating the organic phase and successively washing with 2 N hydrochloric acid, water, a saturated sodium bicarbonate solution and again water, drying and concentrating. The oily product is chromatographed on a 50-fold quantity of silica gel. Elution with petroleum ether/ether (8:2) yields colourless crystals having a melting point of 114 to 116° after crystallization from ether/petroleum ether.

(2) From rac. 3β-chloroformyloxy-14-desmethyl-cassenic acid ethyl ester.—(a) Rac. 3β-chloroformyloxy-14-desmethyl-cassenic acid ethyl ester A solution of 10 g. (30 millimols) of rac. 3β-hydroxy-14-desmethyl-cassenic acid ethyl ester and 2.95 cc. (37 millimols) of pyridine in 400 cc. of absolute benzene is slowly added dropwise to 45 cc. of a molar solution of phosgene in benzene at +5° and in the absence of moisture, whereby a white precipitate results. After the addition is completed the mixture is stirred at room temperature for 2 hours, the reaction mixture is subsequently poured on 50 cc. of ice water, is acidified with 2 N hydrochloric acid and the organic phase is separated. The aqueous phase is again extracted twice with 50 cc. of benzene, the benzene phases are washed thrice with 50 cc. of water, are dried and concentrated. Crystallization of the residue from ether/petroleum ether yields colourless crystals having a melting point of 114 to 116°. Recrystallization is then again effected from ether/petroleum ether whereby colourless leaflets having a melting point of 115 to 116°, are obtained.

UV spectrum: maximum at 221.5 nm. (log ε=4.25)
IR spectrum: inter alia bands at 1771, 1707 and 1648 cm.$^{-1}$
NMR spectrum: inter alia signals at—
    0.83; 0.92; 0.97 p.p.m. singlets for C—CH$_3$ (9H)
    1.27 p.p.m. triplet }
    4.15 p.p.m. quadruplet } for —COOCH$_2$CH$_3$
    3.65–4.15 p.p.m. multiplet for C$_{12}$—H (1H)
    4.60 p.p.m. triplet for CH—OCOCl (1H)
    5.60 p.p.m. wide signal for C=C—H (1H)

(β) Rac. 3β-(allyl-carbamoyloxy)-14-desmethyl-cassenic acid ethyl ester

A solution of 1.11 cc. (15 millimols) of allylamine and 1.01 cc. (12.5 millimols) of pyridine in 40 cc. of absolute benzene is added dropwise during the course of 30 minutes to a solution of 3.97 g. (10 millimols) of rac. 3β-chloroformyloxy-14-desmethyl-cassenic acid ethyl ester in 60 cc. of absolute benzene at +5° and in the absence of moisture. After the addition is completed the reaction mixture is stirred at room temperature for 1½ hours, is subsequently poured on 50 cc. of ice water and extracted in the usual manner. The benzene phases are successively washed with water, 2 N hydrochloric acid and again water, are dried and concentrated. Crystallization of the residue from ether/petroleum ether yields colourless crystals having a melting point of 113 to 116°. Recrystallization is then again effected from ether/petroleum ether, whereby colourless needles, having a melting point of 115 to 117°, are obtained.

UV spectrum: maximum at 222 nm. (log ε=4.27)
IR spectrum: inter alia bands at 3450, 2850, 1710 and 1648 cm.$^{-1}$ NMR spectrum: inter alia signals at—
0.82; 0.85; 0.91 p.p.m. singlets for C—CH$_3$ (9H)

1.26 p.p.m. triplet  
4.15 p.p.m. quadruplet } for —COOCH$_2$CH$_3$ 3.65–4.15 p.p.m. multiplets for C$_{12}$—H and —CONH—CH$_2$—C= (3H)
4.2–5.0 p.p.m. multiplets —CH$_2$—NH—COOCH (1/1H)
5.0–5.4; 5.6–6.3 p.p.m. multiplets for CH$_2$=CH—CH$_2$ (2/1H)
5.60 p.p.m. wide signal for —C=C—H.

(b) Rac. 3-O-(allyl-carbamoyl)-7-desoxo-14-desmethyl-cassaine 3.23 g. (7.7 millimols) of rac. 3β-(allyl-carbamoyl-oxy)-14-desmethyl-cassenic acid ethyl ester are dissolved in 100 cc. of 2-dimethylamino-ethanol, 216 mg. (3.85 millimols) of pulverized potassium hydroxide are added and the mixture is stirred at room temperature overnight. After working up in a manner analogous to that indicated in Example 1(b) the base is obtained in the form of a thin layer chromatographically uniform oil.

IR spectrum: inter alia bands at 3450, 2860, 2760, 1710 and 1647 cm.$^{-1}$
NMR spectrum: inter alia signals at—
0.82; 0.90 p.p.m. singlets for C—CH$_3$ (9H)
2.28 p.p.m. singlets for N(CH$_3$)$_2$ (6H)
2.57; 4.18 p.p.m. triplets for —COOCH$_2$CH$_2$N= (2/2H)
3.6–4.1 p.p.m. multiplets for C$_{12}$—H; =CH—CH$_2$—NH— (3H)
4.2–4.9 p.p.m. multiplets for —CH$_2$—NH—COO—CH—(2H)
4.9–5.4; 5.6–6.1 p.p.m. multiplets for CH$_2$=CH—CH$_2$— (2/1)
5.61 p.p.m. wide signal for C=C—H (1H).

Hydrochloride

The free base is dissolved in acetone, the calculated amount of hydrochloric acid in ether is added and the mixture is carefully concentrated; colourless crystals having a melting point of 202 to 207°. Crystallization is then again effected from methanol/acetone, whereby colourless needles having a melting point of 205 to 208° are obtained.
UV spectrum: maximum at 225.5 nm. (log ε=4.26).

EXAMPLE 3.—RAC. 3-O-CARBAMOYL-7-DESOXO-DESMETHYL-CASSAINE (a) Rac. 3β-chloroformyloxy-14-desmethyl-cassenic acid ethyl ester See Example 2, (2α)

(b) Rac. 3β-(carbamoyloxy)-14-desmethyl-cassenic acid ethyl ester

An ice-cold solution of 11.9 g. (30 millimols) of rac. 3β-chloroformyloxy-14-desmethyl-cassenic acid ethyl ester and 2.85 cc. (35.5 millimols) of pyridine in 200 cc. of absolute tetrahydrofuran is rapidly added to 80 cc. of liquid ammonia in the absence of moisture. After stirring for 30 minutes 50 cc. of ice water are added to the milky reaction phase, whereby the temperature rises to —5° and the reaction mixture separates into 2 distinct phases. After acidifying with dilute hydrochloric acid extraction is effected with a mixture of tetrahydrofuran/ether (1:1), the organic phase is again washed with water, dried and concentrated. The resulting crystalline mash is dissolved in ether and crystallized with the addition of petroleum ether, whereby colourless crystals, having a melting point of 178–180°, are obtained. Recrystallization is subsequently effected from ether whereby colourless prisms, having a melting point of 179–181°, are obtained.

UV spectrum: maximum at 222.5 nm. (log ε=4.25)
IR spectrum: inter alia bands at 3540, 3430, 1717, 1645 and 1582 cm.$^{-1}$
NMR spectrum: inter alia signals at—
0.82; 0.85; 0.90 p.p.m. singlets for C—CH$_3$ (9H)

1.27 p.p.m. triplet  
4.13 p.p.m. quadruplet } for —COOCH$_2$CH$_3$ about 3.75 p.p.m. multiplet for C$_{12}$—H (1H)
about 4.3 p.p.m. multiplet for —CH—OCONH$_2$ (1H)
4.80 p.p.m. wide signal for —OCONH$_2$ (2H)
5.57 p.p.m. wide signal for —C=C—H (1H)

(c) Rac. 3-O-carbamoyl-7-desoxo-14-desmethyl-cassaine 3.35 g. (8.9 millimols) of rac. 3β-(carbamoyloxy)-14-desmethyl-cassenic acid ethyl ester are dissolved in 75 cc. of 2-dimethylaminoethanol, 252 mg. (4.5 millimols) of pulverized potassium hydroxide are added and the mixture is stirred at room temperature. After 6½ hours a further 126 mg. (2.25 millimols) of pulverized potassium hydroxide are added and after 1 hour the reaction mixture is concentrated in a high vacuum at a bath temperature of 45°. The residue is taken up in methylene chloride, is first washed four times with a small amount of water, is then extracted thrice with 2 N tartaric acid while cooling with ice and once with water. The combined acid extracts are made alkaline while cooling with ice and are exhaustively extracted with methylene chloride. After washing with water, drying and concentrating a colourless foam is obtained. The thin layer chromatographically uniform compound is reacted as such to give the salt.

IR spectrum: inter alia bands at 3525, 3420, 1715, 1648 and 1582 cm.$^{-1}$
NMR spectrum: inter alia signals at—
0.82; 0.85; 0.92 p.p.m. singlets for C—CH$_3$ (3H each)
2.28 p.p.m. singlet for N—CH$_3$ (3H)
2.58; 4.18 p.p.m. triplets for =N—CH$_2$—CH$_2$OOC— (2H each)
3.85 p.p.m. multiplet for C$_{12}$—H (1H)
4.4 p.p.m. multiplet for —CH—OCO— (1H)
4.80 p.p.m. wide signal for —OCONH$_2$ (2H)
5.62 p.p.m. wide signal for —C=C—H (1H)

Hydrochloride

The crude base is dissolved in a small amount of methanol, the calculated amount of hydrochloric acid in ether is added, the mixture is concentrated, taken up in acetone and crystallized whereby colourless crystals having a melting point of 220–225°, are obtained. UV spectrum: maximum at 222.5 nm. (log ε=4.25).

EXAMPLE 4.—RAC. 3-O-CARBAMOYL-7-DESOXO-14-DESMETHYL-CASSAINE (a) Rac. 3β-chloroformyloxy-14-desmethyl-tert.-butyl ester A solution of 3.48 g. (10 millimols) of rac. 3β-hydroxy-14-desmethyl-cassenic acid tert.-butyl ester and 1 cc. of pyridine in 100 cc. of absolute benzene is slowly added dropwise at +5° to 30 cc. of a 0.5 molar solution of phosgene in benzene in the absence of moisture, whereby a white precipitate results. After the addition is completed the mixture is stirred at room temperature for 2 hours, is subsequently poured on 25 cc. of ice water and is extracted in the usual manner. The benzene phases are washed thrice with water, dried and concentrated by evaporation. The residue crystallizes from ether-petroleum ether in colourless crystals having a melting point of 157–158°.

UV spectrum: inter alia bands at 221.5 nm. (log ε=4.31)
IR spectrum: inter alia bands at 1772, 1700 and 1648 cm.$^{-1}$ NMR spectrum: inter alia signals at—
  0.83; 0.90; 0.97 p.p.m. singlets for C—CH$_3$ (9H)
  1.47 p.p.m. singlet for C(CH$_3$)$_3$ (9H)
  3.88 p.p.m. multiplet for C$_{12}$—H (1H)
  4.60 p.p.m. multiplet for =CH—OCOCl (1H)
  5.51 p.p.m. singlet for —C=C—H (1H)

(b) Rac. 3β-carbamoyloxy-14-desmethyl-cassenic acid tert.-butyl ester

An ice-cooled solution of 1.97 g. (4.66 millimols) of rac. 3β-chloroformyloxy-14-desmethyl-cassenic acid tert.-butyl ester and 0.47 cc. (5.78 millimols) of pyridine in 25 cc. of absolute tetrahydrofuran is added dropwise to 15 cc. of liquid ammonia in the absence of moisture. After stirring at —50° for 15 minutes the cooling bath is removed, the ammonia is distilled off at room temperature, ice water and methylene chloride are added to the residue, the methylene chloride phase is successively washed with water, 2 N hydrochloric acid, a saturated sodium bicarbonate solution and again water, is dried and concentrated. The residue crystallizes from ether/petroleum ether in colourless crystals having a melting point of 193–195°.

UV spectrum: maximum at 222 nm. (log ε=4.16)
IR spectrum: inter alia bands at 3540, 3440, 1720, 1710 and 1648 cm.$^{-1}$
NMR spectrum: inter alia signals at—
  0.80; 0.83; 0.90 p.p.m. singlets for C—CH$_3$ (9H)
  1.47 p.p.m. singlet for C(CH$_3$)$_3$ (9H)
  3.85 p.p.m. multiplet for C$_{12}$—H (1H)
  4.44 p.p.m. multiplet for =CH—COO— (1H)
  4.75 p.p.m. wide signal for —NH$_2$ (2H)
  5.50 p.p.m. wide signal for —C=C—H (1H)

(c) Rac. 3β-carbamoyloxy-14-desmethyl-cassenic acid 1.25 g. (3.08 millimols) of rac. 3β-carbamoyloxy-14-desmethyl-cassenic acid tert.-butyl ester are dissolved in 12.5 cc. of 80% trifluoroacetic acid and the solution is allowed to stand at room temperature. After 45 minutes 25 cc. of ice water are added, the mixture is exhaustively extracted with methylene chloride, the methylene chloride phases are washed with water until neutral, are dried and concentrated. The residue crystallizes from tetrahydrofuran/ether in colourless crystals having a melting point of 263–266°.

(d) Rac. 3-O-carbamoyl-7-desoxo-14-desmethyl-cassaine

A solution of 0.2 cc. (2.86 millimols) of thionyl chloride in 3 cc. of absolute benzene is added dropwise at +5° during the course of 10 minutes to a solution of 0.92 g. (2.6 millimols) of rac. 3β-carbamoyloxy-14-desmethyl-cassenic acid and 0.4 cc. (2.86 millimols) of triethylamine in 20 cc. of absolute benzene in the absence of moisture. After stirring at room temperature for 1½ hours the mixture is again cooled to +5°, a solution of 0.65 cc. (6.3 millimols) of 2-dimethylaminoethanol and 0.4 cc. (2.86 millimols) of triethylamine in 3 cc. of absolute benzene is added dropwise and the mixture is again stirred at room temperature. After 2 hours 10 cc. of ice water are added, the benzene phase is separated, washed with water, dried and concentrated. The residue is identical with the product obtained in Example 8.

EXAMPLE 5.—RAC. 3-O-(DIALLYL-CARBAMOYL)-7-DESOXO-14-DESMETHYL-CASSAINE (a) Rac. 3β-chloroformyloxy-14-desmethyl-cassenic acid ethyl ester See Example 2, (2α)

(b) Rac. 3β-(diallyl-carbamoyloxy)-14-desmethyl-cassenic acid ethyl ester 1.2 cc. (15 millimols) of pyridine are added to a solution of 4.76 g. (12 millimols) of 3β-chloroformyloxy-14-desmethyl-cassenic acid ethyl ester in 200 cc. of absolute benzene and subsequently a solution of 2.34 cc. of diallyl-amine in 40 cc. of absolute benzene is added dropwise at +5° in the absence of moisture. After the addition is completed, the yellow reaction mixture is stirred at room temperature, after 2½ hours 50 cc. of ice water are added and extraction is effected in the usual manner with benzene. The benzene phases are successively washed with water, 2 N hydrochloric acid and again water, are dried and concentrated. The colourless oil obtained as residue is dissolved in ligroin and made to crystallize whereby colourless crystals having a melting point of 95–97°, are obtained. After recrystallizing again from ligroin colourless needles, having a melting point of 97–98°, are obtained.

UV spectrum: maximum at 222.5 nm. (log ε=4.25)
IR spectrum: inter alia bands at 2850, 1687, 1643 cm.$^{-1}$
NMR spectrum: inter alia signals at—
  0.82; 0.88; 0.92 p.p.m. singlets for C—CH$_3$ (9H)
  1.27 p.p.m. triplet \} for —COOCH$_2$CH$_3$
  4.15 p.p.m. quadruplet
  3.88 p.p.m. doublet (J=5.5 c.p.s.) for
    =CH—CH$_2$—N+multiplet for C$_{12}$—H (5H)
  4.4 p.p.m. multiplet for —CH—OCON= (1H)
  5.0; 5.7 p.p.m. multiplets for —CH$_2$—CH=CH$_2$
  5.60 p.p.m. wide signal for —C=C—H (1H)

(c) Rac. 3-O-(diallyl-carbamoyl)-7-desoxo-14-desmethyl-cassaine 4.0 g. (8.75 millimols) of rac. 3β-(diallyl-carbamoyloxy)-14-desmethyl-cassenic acid ethyl ester are dissolved in 75 cc. of 2-dimethylaminoethanol, 245 mg. (4.38 millimols) of pulverized potassium hydroxide are added and the mixture is stirred at room temperature overnight. After carefully concentrating the reaction mixture in a high vacuum, the residue is taken up in methylene chloride, is washed four times with water, dried and concentrated. The resulting oily residue is chromatographed on a 40-fold quantity of silica gel for further purification. Elution with methylene chloride +2 or 3% of methanol yields an oily base which is uniform in accordance with thin layer chromatography.

UV spectrum: maximum at 223 nm. (log ε=4.29)
IR spectrum: inter alia bands at 1690, 1645 cm.$^{-1}$
NMR spectrum: inter alia signals at—
  0.82; 0.87; 0.92 p.p.m. singlets for C—CH$_3$ (3H each)
  2.35 p.p.m. singlet for N—CH$_3$ (3H)
  2.65; 4.24 p.p.m. triplets for
    =N—CH$_2$CH$_2$—OOC— (2H each)
  3.88 p.p.m. doublet (J=5 c.p.s.) for
    —N—CH$_2$—CH$_2$= +multiplet for C$_{12}$—H (5H)
  4.4 p.p.m. multiplet for —CH—OCO— (1H)
  5.1; 5.7 p.p.m. multiplets for CH$_2$—CH= (6H)
  5.64 p.p.m. wide signal for —C=C—H (1H)

Tosylate

The crude base is dissolved in a small amount of acetone, the calculated amount of p-toluene sulphonic acid in acetone is added, the mixture is somewhat concentrated and crystallized with the addition of ether, whereby colourless crystals, having a melting point of 87–90°, are obtained.

EXAMPLE 6.—RAC. 3-O-(METHYL-CARBAMOYL)-7-DESOXO-14-DESMETHYL-CASSAINE (a) Rac. 3β-chloroformyloxy-14-desmethyl-cassenic acid ethyl ester See Example 2, (2α).

(b) Rac. 3β-(methyl-carbamoyloxy)-14-desmethyl-cassenic acid ethyl ester

A solution of 1.51 cc. (18.75 millimols) of pyridine and 1.01 cc. (22.7 millimols) of methylamine in 80 cc. of absolute benzene is added dropwise at +5° during the course of 30 minutes to a solution of 5.96 g. (15 millimols) of rac. 3β-chloroformyloxy-14-desmethyl-cassenic acid ethyl ester in 200 cc. of absolute benzene in the absence of moisture. After the addition is completed the reaction mixture is stirred at room temperature for 1½ hours, is subsequently poured on 75 cc. of ice water and extraction is effected in the usual manner. The benzene phases are successively washed with water, 2N hydrochloric acid and again water, are dried and concentrated. Crystallization of the residue from ether/petroleum ether yields colourless needles, having a melting point of 160–163°.

UV spectrum: maximum at 222 nm. (log ε=4.29)
IR spectrum: inter alia bands at 3460, 1708 and 1645 cm.$^{-1}$
NMR spectrum: inter alia signals at—
  0.82; 0.83; 0.90 p.p.m. singlets for C—CH$_3$ (9H)
  1.27 p.p.m. triplet
  4.17 p.p.m. quadruplet } for —COOCH$_2$CH$_3$
  2.80 p.p.m. doublet for NH—CH$_3$ (3H)
  about 3.9 p.p.m. multiplet for C$_{12}$—H
  about 4.5 p.p.m. multiplets for —NH—COO—CH= (1/1H)
  5.59 p.p.m. singlet for —C—C—H (1H)

(c) Rac. 3-O-(methyl-carbamoyl)-7-desoxo-14-desmethyl-cassaine 3.62 g. (9.25 millimols) of rac. 3β-methyl-carbamoyloxy)1,4-desmethyl-cassenic acid ethyl ester are dissolved in 90 cc. of 2 - dimethylaminoethanol, 259 mg. (4.6 millimols) of pulverized potassium hydroxide are added and the mixture is stirred at room temperature overnight. After working up in a manner analogous to that described in Example 1(b) the base is obtained in the form of a thin layer chromatographically uniform oil.

UV spectrum: maximum at 224.5 nm. (log ε=4.25)
IR spectrum: inter alia bands at 3470, 2780, 1710 and 1648 cm.$^{-1}$
NMR spectrum: inter alia signals at—
  0.82; 0.83; 0.90 p.p.m. singlets for C—CH$_3$ (9H)
  2.30 p.p.m. singlet for —N(CH$_3$)$_2$ (6H)
  2.60; 4.22 p.p.m. triplets for
    —COO—CH$_2$—CH$_2$—N= (2/2H)
  3.90 p.p.m. multiplet for C$_{12}$—H
  about 4.5 p.p.m. multiplet for
    —NH—COO—CH= (2H)
  5.65 p.p.m. wide signal for —C=C—H (1H)

Hydrochloride

The free base is dissolved in acetone, the calculated amount of hydrochloric acid in ether is added and the mixture is carefully concentrated. Crystallization from acetone/ether yields colourless crystals having a melting point of 229–231°.

EXAMPLE 7.—RAC. 3-O-(ETHYL-CARBAMOYL)-7-DESOXO-14-DESMETHYL-CASSAINE (a) Rac. 3β-chloroformyl-14-desmethyl-cassenic acid ethyl ester See Example 2, (2α).

(b) Rac. 3β-(ethyl-carbamoyloxy)-14-desmethyl-cassenic acid ethyl ester

A solution of 1.45 cc. (22.7 millimols) of ethylamine and 1.51 cc. (18.75 millimols) of pyridine in 80 cc. of absolute benzene is added dropwise at +5° during the course of 30 minutes to a solution of 5.96 g. (15 millimols) of rac. 3β-chloroformyloxy - 14 - desmethyl-cassenic acid ethyl ester in 200 cc. of absolute benzene in the absence of moisture. After the addition is completed the reaction mixture is stirred for 1½ hours while cooling with ice, is subsequently poured on 75 cc. of ice water and extraction is effected in the usual manner. The benzene phases are successively washed with water, 2 N hydrochloric acid and again water, are dried and concentrated. Crystallization of the residue from ether/petroleum ether yields colourless crystals having a melting point of 140–141°.

UV spectrum: maximum at 222.5 nm. (log ε=4.29)
IR spectrum: inter alia bands at 3450, 1710 and 1648 cm.$^{-1}$
NMR spectrum: inter alia signals at—
  0.82; 0.83; 0.90 p.p.m. singlets for C—CH$_3$ (9H)
  1.13; 3.24 p.p.m. triplet or multiplet for
    —OCONHCH$_2$CH$_3$
  1.27; 4.15 p.p.m. or quadruplet for —COOCH$_2$CH$_3$
  about 3.9 p.p.m. multiplet for C$_{12}$—H
  about 4.5 p.p.m. multiplet for —NH—COO—CH=
  5.60 p.p.m. singlet for —C=C—H (1H)

(c) Rac. 3-O-(ethyl-carbamoyl)-7-desoxo-14-desmethyl-cassaine 1.65 g. (3.62 millimols) of rac. 3β - (ethyl-carbamoyloxy) - 14 - desmethyl-cassenic acid ethyl ester are dissolved in 35 cc. of 2-dimethylaminoethanol, 115 mg. (1.81 millimols) of pulverized potassium hydroxide are added and the mixture is stirred at room temperature overnight. After working up in a manner analogous to that indicated in Example 1(b) the base is obtained in the form of a thin layer chromatographically uniform oil.

UV spectrum: maximum at 224 nm. (log ε=4.20)
IR spectrum: inter alia bands at 3450, 2775, 1710 and 1648 cm.$^{-1}$
NMR spectrum: inter alia signals at—
  0.82; 0.85; 0.92 p.p.m. singlets for C—CH$_3$ (9H)
  1.17; 3.24 p.p.m. triplet or multiplet for
    —OCONHCH$_2$CH$_3$
  2.32 p.p.m. singlet for N(CH$_3$)$_2$ (6H)
  2.62; 4.24 p.p.m. triplets for
    —COO—CH$_2$CH$_2$—N= (2/2H)
  about 3.9 p.p.m. multiplet for C$_{12}$—H
  about 4.6 p.p.m. multiplet for
    =NH—COO—CH= (2H)
  5.65 p.p.m. wide signal for —C=C—H (1H)

Hydrochloride

The free base is dissolved in acetone, the calculated amount of hydrochloric acid in ether is added and the mixture is carefully concentrated. Crystallization from acetone/ether yields colourless crystals having a melting point of 199–203°.

EXAMPLE 8

Rac. 3β - hydroxy - 14 - desmethyl - cassenic acid ethyl ester and rac. 7-desoxo - 14 - desmethyl-cassaine used as starting materials, are produced as follows:

(a) The production of a mixture of rac. 3-oxo-14-desmethyl-cassenic acid ethyl ester and rac. 3-oxo-14-desmethyl-isocassenic acid ethyl ester.

(α) 2,7-dioxo-1,1,4a-trimethyl-perhydrophenanthrene (trans-anti-trans)

14.8 g. (2.13 mols) of lithium are added portionwise to 4 litres of liquid ammonia while stirring, passing through a stream of nitrogen and in the absence of moisture. The dark blue solution is cooled to —50° and a solution of 70 g. (0.267 mol) of 4,4a,4b,5,6,7,8,8a,9,10-decahydro - 7 - hydroxy - 4b,8,8 - trimethyl-2(3H)-phenanthrone in 1.6 litres of absolute tetrahydrofuran is then immediately allowed to flow in rapidly. After stirring at —50° for 3 hours, 120 g. of ammonium chloride are added and the ammonia is distilled off overnight from the colourless reaction mixture. The resulting residue is concentrated in a vacuum and extracted with methylene chloride. The organic phase is purified by washing with water, drying and concentrating in a vacuum.

The resulting dark brown, viscous oil is dissolved in 550 cc. of glacial acetic acid, 265 cc. of a 10% solution of chromium trioxide in 90% acetic acid are slowly added while cooling with ice and the mixture is allowed to stand at room temperature overnight. After the addition of a small amount of ethanol, the mixture is concentrated in a vacuum, the residue is taken up in ether, the ether solution is washed with a saturated aqueous sodium bicarbonate solution, is dried and concentrated. The residue is crystallized from acetone whereby colourless prisms having a melting point of 130–132° are obtained.

A further amount of compound may be obtained from the mother liquor by chromatography on silica gel and elution with a mixture of petroleum ether/ether (7:3).

UV spectrum: maximum at 286 nm. (log $\epsilon$=1.64)
IR spectrum: inter alia band at 1710 cm.$^{-1}$
NMR spectrum:
  inter alia signals at 1.03; 1.07; 1.11 p.p.m.
  singlets for C—$CH_3$ (9H).

($\beta$) Mixture of rac. 3-oxo-14-desmethyl-cassenic acid ethyl ester with rac. 3-oxo - 14 - desmethyl-isocassenic acid ethyl ester A solution of 67.3 g. (0.3 mol) of phosphonoacetic acid triethyl ester in 400 cc. of absolute dimethylformamide is added dropwise to a suspension of 6.9 g. (0.29 mol) of sodium hydride in 250 cc. of absolute dimethylformamide in the absence of moisture and while passing through a stream of nitrogen, at such a rate that the reaction temperature does not exceed 20°. After the addition is completed the mixture is stirred at room temperature for 30 minutes and a solution of 52.5 g. (0.2 mol) of 2,7-dioxo-1,1,4a-trimethyl-perhydro-phenanthrene (trans-anti-trans) in 400 cc. of absolute dimethylformamide is subsequently added dropwise at room temperature during the course of 45 minutes to the yellow, clear reaction mixture. After stirring at room temperature for 2½ hours 100 cc. of ice water are added to the reaction product and exhaustive extraction is effected with a mixture of ether/petroleum ether (1:1). The organic phase is successively washed with 2 N hydrochloric acid, water, a saturated sodium bicarbonate solution and again water, is dried and concentrated. A yellowish brown oil, which contains the two geometrical isomers, is obtained as residue.

(b) Separation of a mixture of rac. 3-oxo-14-desmethyl-cassenic acid ethyl ester and rac. 3-oxo-14-desmethyl-isocassenic acid ethyl ester 69.0 g. of a mixture of the geometric isomers of rac. 3-oxo-14-desmethyl-cassenic acid ethyl ester and the corresponding iso-compound are chromatographed on 2 kg. of silica gel. Elution with 16 litres of petroleum ether or a mixture of petroleum ether/ether (95:5) yields small amounts of impurities which are discarded. The further elution with a mixture of petroleum ether/ether (9:1) yields in the first 8 fractions (fractions $a$ to $h$) of 2 litres each a crystalline product which is uniform in accordance with thin layer chromatography. These combined fractions ($a$–$h$) yield colourless crystals having a melting point of 93–97° after crystallization from ether/petroleum ether.

A further amount of compound, having a melting point of 93–97°, may be isolated by repeated chromatography of the mixed fractions and mother liquors. After taking up in a very small amount of ether and precipitating with petroleum ether, colourless prisms having a melting point of 96–98°, are obtained. This geometric isomer, which is derived from isocassenic acid, is further characterized by the following physical constants:

UV spectrum:
  maximum at 222.5 nm. (log $\epsilon$=4.22)
  shoulder at 300 nm. (log $\epsilon$=1.38)

IR spectrum: inter alia bands at 1708, 1702 and 1648 cm.$^{-1}$
NMR spectrum: inter alia signals at—
  0.98; 1.05; 1.08 p.p.m. singlets for C—$CH_3$ (3H each)
  1.27 p.p.m. triplet } for —$COOCH_2CH_3$
  4.17 p.p.m. quadruplet
  3.7–4.0 p.p.m. multiplets for $C_{14}$—H (1H)
  5.62 p.p.m. wide singlet for C=C—H (1H)

On continuing elution with a mixture of petroleum ether/ether (9:1) the following 12 fractions ($h$-$t$) of 2 litres each contain compound mixtures, whereas the following fractions ($u$ and following) again yield a uniform compound with the same solvent. The combined fractions ($u$ and following) crystallize from ether/petroleum ether and yield colourless crystals having a melting point of 80–82°.

A further amount of compound, having a melting point of 80–82°, may be isolated by repeated chromatography of the mixed fractions and mother liquors. After recrystallizing from ether/petroleum ether the resulting colourless prisms have a melting point of 81–82°. This geometric isomer, which is derived from cassenic acid, is further characterized by the following physical constants:

UV spectrum:
  maximum at 222 nm. (log $\epsilon$=4.22)
  shoulder at 300 nm. (log $\epsilon$=1.37)
IR spectrum: inter alia bands at 1705, 1700, and 1648 cm.$^{-1}$
NMR spectrum: inter alia signals at—
  0.98; 1.05; 1.08 p.p.m. singlets for C—$CH_3$ (3H each)
  1.27 p.p.m. triplet } for —$COOCH_2CH_3$
  4.17 p.p.m. quadruplet
  3.7–4.1 p.p.m. multiplet for $C_{12}$—H (1H)
  5.62 p.p.m. wide singlet for C=C—H (1H)

(c) Rac. 3$\beta$-hydroxy-14-desmethyl-cassenic acid ethyl ester 246 mg. (6.25 millimols) of sodium borohydride are added in 2 portions at room temperature to a solution of 1.66 g. (5 millimols) of rac. 3-oxo-14-desmethyl-cassenic acid ethyl ester in 30 cc. of absolute methanol while passing through a stream of nitrogen, whereby gas evolution and a slight rise in temperature occur. After stirring at room temperature for 3 hours 10 cc. of ice water are added, the mixture is concentrated in a vacuum and the residue extracted with methylene chloride. The organic phase is washed with 2 N hydrochloric acid, water, a saturated sodium bicarbonate solution and again water and is dried. After removing the solvent, an oil is obtained; after recrystallizing this oil twice from ether/petroleum ether colourless prisms having a melting point of 117–118° are obtained.

UV spectrum: maximum at 222 nm. (log $\epsilon$=4.26)
IR spectrum: inter alia bands at 3600, 1708 and 1648 cm.$^{-1}$
NMR spectrum: inter alia signals at—
  0.80; 0.98 p.p.m. singlets for C—$CH_3$ (6 or 3H)
  1.27 p.p.m. triplet } for —$COOCH_2CH_3$
  4.15 p.p.m. quadruplet
  3.0–3.5 p.p.m. multiplet for CH—OH (1H)
  3.6–4.1 p.p.m. multiplet for $C_{12}$—H (1H)
  5.6 p.p.m. wide singlet for C=C—H (1H).

(d) Rac. 7-desoxo - 14 - desmethyl-cassaine [rac. 3$\beta$-hydroxy - 14 - desmethyl-cassenic acid $\beta$(dimethylamino) ethyl ester]

8.0 g. (24 millimols) of rac. 3$\beta$-hydroxy-14-desmethyl-cassenic acid ethyl eter are dissolved in 150 cc. of 2-dimethylaminoethanol, 670 mg. (12 millimols) of pulverized potassium hydroxide are added and the mixture is stirred at room temperature overnight. The pale yellow reaction solution is carefully concentrated in a high vacuum and the residue is taken up in ether. The ether solution is washed with water and extracted thrice with ice-cooled 2 N hydrochloric acid. The aqueous hydrochloric acid extract is made alkaline with ammonia, is exhaustively extracted with methylene chloride and the organic phase is dried and concentrated. A yellowish oil is isolated from the hydrochloric acid extract; after crystallizing twice from acetone/ether and drying at 60° this oil yields colourless crystals of rac. 7-desoxo-14-desmethyl-cassaine, having a melting point of 112–113°.

UV spectrum: maximum at 223.5 nm. (log $\epsilon$=4.23)
IR spectrum: inter alia bands at 3610, 2780, 1710 and 1650 cm.$^{-1}$
NMR spectrum: interalia signals at—
  0.80; 0.98 p.p.m. singlets for C—CH$_3$ (6 or 3H)
  2.30 p.p.m. singlet for —N(CH$_3$)$_2$ (6H)
  2.60; 4.20 p.p.m. triplets for —OCH$_2$CH$_2$N— (2H each)
  about 3.0–3.5 p.p.m. multiplet for —CH—OH (1H)
  about 3.9 p.p.m. multiplet for —C$_{12}$—H (1H)
  5.64 p.p.m. wide signal for C=C—H (1H)

Hydrochloride

After recrystallizing twice from methanol/acetone colourless prisms, having a melting point of 225–227°, are obtained.

EXAMPLE 9

The rac. 3$\beta$-hydroxy-14-desmethyl-cassenic acid tert.-butyl ester used as starting material is produced as follows:

(a) Mixture of rac. 3-oxo-14-desmethyl-cassenic acid/isocassenic acid tert.-butyl ester A solution of 27.5 g. (125 millimols) of O,O-diethyl-phosphonoacetic acid tert.-butyl ester in 180 cc. of absolute dimethyl formamide is added dropwise to a suspension of 3.0 g. (125 millimols) of sodium hydride in 180 cc. of absolute dimethyl formamide in the absence of moisture and while passing through a stream of nitrogen, at such a rate that the reaction temperature does not exceed 20°. After the addition is completed the mixture is stirred at room temperature for 30 minutes and a solution of 21.82 g. (83.6 millimols) of 2,7-dioxo-1,1,4a-trimethyl-perhydro-phenanthrene (trans-anti-trans) in 300 cc. of absolute dimethyl formamide is subsequently added dropwise to the yellow, clear reaction mixture at room temperature during the course of 45 minutes. After stirring at room temperature for 4 hours 100 cc. of ice water are added to the reaction product and exhaustive extraction is effected with ether. The organic phase is successively washed with 2 N hydrochloric acid, water, a saturated sodium bicarbonate solution and again water, is dried and concentrated. The yellow oil obtained as residue contains the 2 geometric isomers, rac. 3-oxo-14-desmethyl-isocassenic acid tert.butyl ester and rac. 3-oxo-14-desmethyl-isocassenic acid tert.-butyl ester.

(b) Separation of a mixture of rac. 3-oxo-14-desmethyl-cassenic acid tert.-butyl ester and rac. 3-oxo-14-desmethyl-isocassenic acid tert-butyl ester 33.0 g. of a crude mixture of the two geometric isomers of rac. 3-oxo-14-desmethyl-cassenic acid/isocassenic acid tert.-butyl ester are chromatographed on a 25-fold quantity of silica gel for purposes of purification. Elution with 15 litres of petroleum ether yields a small amount of by-product, which is discarded. The mixture of isomers is obtained by further elution with about 15 litres of a mixture of petroleum ether/ether (9:1). The oily substance is dissolved in petroleum ether, the solution is concentrated to a volume of 140 cc. and is allowed to crystallize by allowing to stand at room temperature. Filtration and washing with cold petroleum ether are effected whereby colourless crystals having a melting point of 128–130°, are obtained.

This geometric isomer, rac. 3-oxo-14-desmethyl-cassenic acid tert.-butyl ester, which is a derivative of cassenic acid, is further characterized by the following physical data:

UV spectrum:
  maximum at 221.5 nm. (log $\epsilon$=4.28) shoulder at 270 nm. (log $\epsilon$=2.40)
IR spectrum: inter alia bands at 1700 and 1648 cm.$^{-1}$
NMR spectrum: inter alia signals at—
  0.98; 1.05; 1.08 p.p.m. singlets for C—CH$_3$ (3H each)
  1.47 p.p.m. singlet for C(CH$_3$)$_3$ (9H)
  3.9 p.p.m. multiplet for C$_{12}$—H (1H)
  5.55 p.p.m. wide signal for C=C—H (1H)

The mother liquor remaining after separation of the above compound is concentrated to a volume of 100 cc. and is allowed to stand first at room temperature and subsequently in the cold. Filtration and washing with cold petroleum ether are effected whereby colourless crystals having a melting point of 104–106°, are obtained. After recrystallizing from ether/petroleum ether the colourless needles have a melting point of 105–107°.

This geometric isomer, rac. 3-oxo-14-desmethyl-isocassenic acid tert.-butyl ester, which is a derivative of isocassenic acid, is further characterized by the following physical data:

UV spectrum:
  maximum at 222 nm. (log $\epsilon$=4.27) shoulder at 260 nm. (log $\epsilon$=2.67)
IR spectrum: inter alia bands at 1700 and 1649 cm.$^{-1}$
NMR spectrum: inter alia signals at—
  0.98; 1.05; 1.08 p.p.m. singlets for C=CH$_3$ (3H each)
  1.48 p.p.m. singlet for C(CH$_3$)$_3$ (9H)
  3.8 p.p.m. multiplet for C$_{14}$—H (1H)
  5.56 p.p.m. wide signal for C=C—H (1H)

Further amounts of pure compound may be isolated by chromatography of the remaining mother liquors on a 50-fold quantity of silica gel. Small amounts of impurities are removed by elution with petroleum ether and a mixture of petroleum ether/ether (95.5). Elution with a mixture of petroleum ether/ether (9:1) first yields the pure isomer having a melting point of 105–107° and after a few mixed fractions with the same eluant mixture a further amount of compound having a melting point of 125–128°, is obtained.

(c) Rac. 3$\beta$-hydroxy-14-desmethyl-cassenic acid tert.-butyl ester 142 mg. (3.75 millimols) of sodium borohydride are added in 3 portions at room temperature to a solution of 1.08 g. (3 millimols) of rac. 3-oxo-14-desmethyl-cassenic acid tert.-butyl ester in 20 cc. of methanol. After stirring at room temperature for 1½ hours 10 cc. of ice water are added, the mixture is concentrated in a vacuum and the residue is exhaustively extracted with methylene chloride. The organic phase is successively washed with 2 N hydrochloric acid, water, a saturated sodium bicarbonate solution and again water, is dried and concentrated. The residue, rac. 3$\beta$-hydroxy - 14 - desmethyl-cassenic acid tert.-butyl ester, crystallizes from ether/petroleum ether in colourless crystals having a melting point of 137–139°.

UV spectrum:
  maximum at 222.5 nm. (log $\epsilon$=4.29)
  shoulder at 260 nm. (log $\epsilon$=2.80)
IR spectrum: inter alia bands at 3620, 1700, 1645 cm.$^{-1}$
NMR spectrum: inter alia signals at—
  0.80; 0.98 p.p.m. singlets for C—CH$_3$ (6 or 3H)
  1.47 p.p.m. singlet for —C(CH$_3$)$_3$ (9H)
  3.25 p.p.m. multiplet for CH—OH (1H)
  3.9 p.p.m. multiplet for C$_{12}$—H (1H)
  5.52 p.p.m. wide signal for C=C—H (1H).

What is claimed is:
1. A compound of the formula:

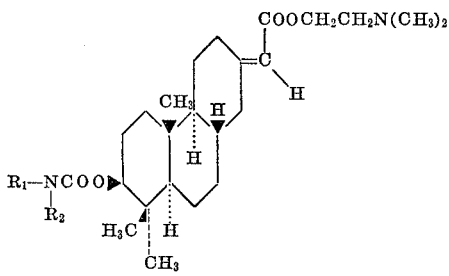

in which
R$_1$ is hydrogen,
R$_2$ is hydrogen, alkyl of 1 to 4 carbon atoms or alkenyl of 1 to 4 carbon atoms, or
R$_1$ and R$_2$ are each independently alkenyl of 1 to 4 carbon atoms, or
a pharmaceutically acceptable acid addition salt thereof.

2. A compound as claimed in claim 1 which is 3-O-(n-butyl-carbamoyl)-7-desoxo-14-desmethyl-cassaine.

3. A compound as claimed in claim 1, which is 3-O-(n-butyl-carbamoyl)-7-desoxo - 14 - desmethyl-cassaine hydrochloride.

4. A compound as claimed in claim 1, which is 3-O-(allyl-carbamoyl)-7-desoxo-14-desmethyl-cassaine.

5. A compound as claimed in claim 1, which is 3-O-(allyl-carbamoyl)-7-desoxo - 14 - desmethyl-cassaine hydrochloride.

6. A compound as claimed in claim 1, which is 3-O-carbamoyl-7-desoxo-14-desmethyl-cassaine.

7. A compound as claimed in claim 1, which is 3-O-carbamoyl - 7 - desoxo-14-desmethyl-cassaine hydrochloride.

8. A compound as claimed in claim 1, which is 3-O-(diallyl-carbamoyl)-7-desoxo-14-desmethyl-cassaine.

9. A compound as claimed in claim 1, which is 3-O-(diallyl-carbamoyl) - 7 - desoxo - 14 - desmethyl-cassaine tosylate.

10. A compound as claimed in claim 1, which is 3-O-(methyl-carbamoyl) - 7 - desoxo-14-desmethyl-cassaine.

11. A compound as claimed in claim 1, which is 3-O-(methyl-carbamoyl) - 7 - desoxo-14-desmethyl-cassaine hydrochloride.

12. A compound as claimed in claim 1, which is 3-O-(ethyl-carbamoyl)-7-desoxo-14-desmethyl-cassaine.

13. A compound as claimed in claim 1, which is 3-O-(ethyl-carbamoyl) - 7 - desoxo-14-desmethyl-cassaine hydrochloride.

References Cited
UNITED STATES PATENTS
3,536,724  10/1970  Rüegger et al. _____ 260—294.3
3,553,251  1/1971  Hauth et al. _____ 260—468.5

LORRAINE A. WEINBERGER, Primary Examiner

R. GERSTL, Assistant Examiner

U.S. Cl. X.R.
260—247.2 B, 347.4, 463, 471 C, 482 C, 514.5; 424—300